United States Patent [19]

Oouchi et al.

[11] Patent Number: 4,520,634
[45] Date of Patent: Jun. 4, 1985

[54] MULTI-STAGE ABSORPTION REFRIGERATION SYSTEM

[75] Inventors: Tomihisa Oouchi; Sampei Usui; Tamio Fukuda; Akira Nishiguchi, all of Ibaraki, Japan

[73] Assignee: Hitachi, Ltd., Tokyo, Japan

[21] Appl. No.: 599,482

[22] Filed: Apr. 12, 1984

[30] Foreign Application Priority Data

Apr. 13, 1983 [JP] Japan ................................. 58-63596

[51] Int. Cl.³ ............................................. F25B 15/00
[52] U.S. Cl. ..................................................... 62/476
[58] Field of Search ........................................... 62/476

[56] References Cited

U.S. PATENT DOCUMENTS

| 3,742,728 | 7/1973 | Mamiya | 62/476 |
| 3,831,397 | 8/1974 | Mamiya | 62/476 |
| 4,085,595 | 4/1978 | Saito et al. | 62/476 |
| 4,439,999 | 4/1984 | Mori et al. | 62/476 X |

Primary Examiner—Lloyd L. King
Attorney, Agent, or Firm—Antonelli, Terry & Wands

[57] ABSTRACT

A triple-stage absorption refrigeration system including three generators. Solution is supplied from absorber directly to each of the three generators in parallel with each other without flowing through any other generator, and cooling medium is made to flow firstly through the condenser and then through the absorber. Due to these features, corrosion of walls of the first generator in which temperature becomes highest can be inhibited.

10 Claims, 4 Drawing Figures

MULTI-STAGE ABSORPTION REFRIGERATION SYSTEM

BACKGROUND OF THE INVENTION (1) Field of the Invention

This invention relates to a multi-stage absorption refrigeration system suitable for use as an airconditioning system for effecting space cooling and space heating, for example.

(2) Description of the Prior Art

An absorption refrigeration system equipped with more than three generators is disclosed in U.S. Pat. No. 3,742,728 or U.S. Pat. No. 3,831,397, for example.

Multi-stage absorption refrigeration systems are characterized by having a high coefficient of performance (refrigeration effect/heat input). In a typical multi-stage absorption refrigeration system, a refrigerant in a gaseous state produced in a first generator is used as a heat source of a second generator, a refrigerant in a gaseous state produced in the second generator is used as a heat source of a third generator and in this way refrigerant gases produced in the preceding generators are successively used as heat sources of the next following generators. To this end, the temperature and pressure of the refrigerant in the gaseous state in the first generator should be so high that gas refrigerant can be produced even in the final generator. Such high temperature level as serves this purpose would accelerate the process of corrosion of walls of the first generator. The inventions disclosed in the documents referred to hereinabove provide no solution for essentially preventing such corrosion.

In U.S. Pat. No. 3,367,134 and U.S. Pat. No. 3,367,135, there is a description to the effect that the cooling medium coming from the condenser section flows through tubes in the absorber, section before being discharged. However, there is found no description in the documents referred to hereinabove with respect to the object for flowing the cooling medium in the manner described, nor to the combination of the aforesaid flow system of the cooling medium with the multi-stage absorption refrigeration cycle. Further, there is disclosed no absorbent solution supply system which supplies an absorbent solution directly to all generators without passing through other generators than the generator to which it is destined.

SUMMARY OF THE INVENTION

An object of this invention is to provide a multi-stage absorption refrigeration system incorporating therein a combination of a cooling medium flow system and an absorbent solution supply system suitable for use with the multi-stage absorption refrigeration cycle having more than three generators.

Another object is to provide a multi-stage absorption refrigeration system incorporating therein a combination of a cooling medium flow system and an absorbent solution supply system capable of preventing corrosion of walls of a first generator in which the temperature rises to a highest level in the refrigeration cycle.

Another object is to provide a multi-stage absorption refrigeration system incorporating therein a combination of a cooling medium flow system and an absorbent solution supply system capable of reducing the heating temperature of a first generator in which the temperature rises to a highest level in the refrigeration cycle.

Still another object is to provide a multi-stage absorption refrigeration system having a cooling medium flow system which permits various types of heat sources to be used.

To accomplish the aforesaid objects, the invention provides a combination of the following: the multi-stage absorption refrigeration cycle provided with at least three generators, wherein gas refrigerant produced in a first generator is used as a heating source of a second generator, gas refrigerant produced in the second generator is used as a heating source of a third generator and in this way the gas refrigerant produced in a generator of the preceding stage is used as a heating source of a generator of the next following stage; a cooling medium flow system wherein a cooling medium flows through an absorber after flowing through a condenser; and a dilute solution supply system wherein a dilute solution containing relatively much cooling medium is supplied directly to each generator without passing through other generators.

DESCRIPTION OF THE PREFERRED EMBODIMENTS

Figure 1:
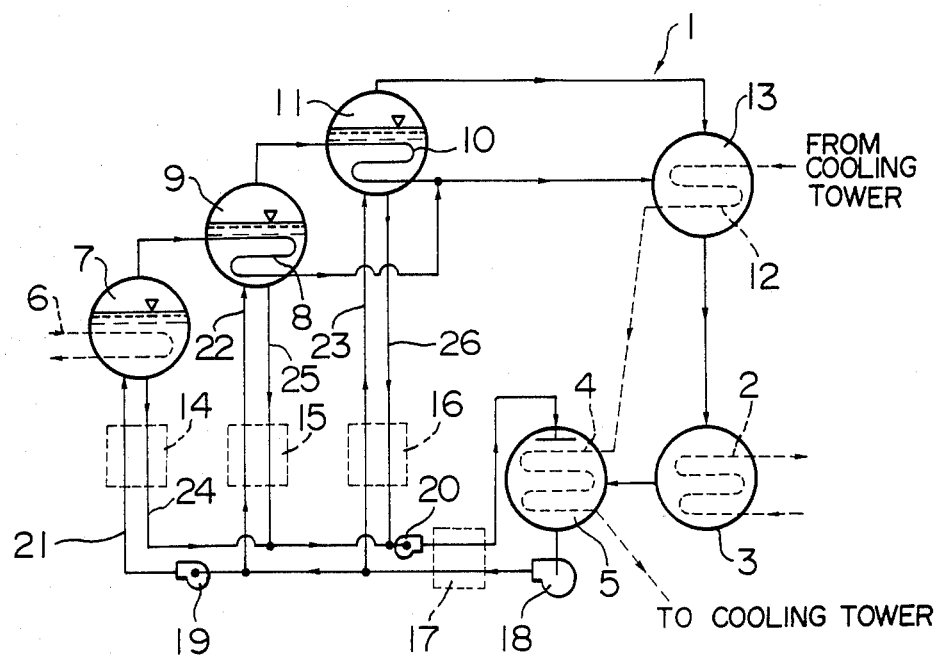
FIG. 1 is a schematic view of one embodiment of the invention.

FIG. 1 is a schematic view of a first embodiment of the invention, wherein a triple-stage absorption refrigeration system 1 comprises an evaporator 3 where a refrigerant (water) is vaporized to cool a medium (water) to be cooled flowing through a heat transfer tube 2, an absorber 5 where gas refrigerant produced in the evaporator 3 is absorbed in a solution of lithium bromide (hereinafter solution) while cooling the gas refrigerant and solution by the cooling medium (water) flowing through a heat transfer tube 4 to produce a dilute solution of lithium bromide (hereinafter dilute solution), a first generator 7 where the dilute solution produced in the absorber 5 heated by an external heat source (burner, superheated steam, exhausted heat, exhausted steam of a steam turbine, etc.) 6 so as to produce gas refrigerant, a second generator 9 where the gas refrigerant produced in the first generator 7 is introduced into a heating tube 8 to serve as a heating source to produce gas refrigerant, a third generator 11 where the gas refrigerant produced in the second generator 7 is introduced into a heating tube 10 to serve as a heating source to produce gas refrigerant, a condenser 13 where by the cooling medium flowing through a heat transfer tube 12 are cooled the gas refrigerant produced in the first generator 7 and flowing through the heating tube 8, the gas refrigerant produced in the second generator 9 and flowing through the heating tube 10, and gas refrigerant produced in the third generator 11, a first heat exchanger 14 where heat exchange takes place between the solution flowing into the first generator 7 and the solution flowing out of the first generator 7, a second heat exchanger 15 where heat exchange takes place between the solution flowing into the second generator 9 and the solution flowing out of the second generator 9, a third heat exchanger 16 where heat exchange takes place between the solution flowing into the third generator 11 and the solution flowing out of the third generator 11, a fourth heat exchanger 17 where heat exchange takes place between the solution just before being introduced into the absorber 5 and the solution flowing out of the absorber 5, a first solution pump 18 and a second solution pump 19 for supplying dilute solution produced in the absorber 5 to the first, second and third generators 7, 9 and 11, and a solution spray pump 20 for spraying a concentrated solution on to the absorber 5. The evaporator 3 is equipped with a refrigerant spray nozzles, not shown, of the type described in U.S. Pat. No. 3,367,134.

The absorber 5 is connected to the first solution pump 18 which in turn is connected on the discharge side to the first generator 7 through a first solution supply line 21. Solution supply lines 22 and 23 branch off the solution supply line 21, the former being connected to the second generator 9 and the latter to the third generator 11. By this arrangement, dilute solution is supplied from the absorber 5 to the first, second and third generators. 7, 9 and 11 in parallel with each other. The first generator 7 and absorber 5 are connected to each other by a first solution return line 24 to which second and third solution return lines 25 and 26 join. The second solution return line 25 is connected to the second generator 9 while the third solution return line 26 is connected to the third generator 11. By this arrangement, solution returns from the first, second and third generators 7, 9 and 11 directly to the absorber 5 in parallel with each other without passing through any other generator. The heat transfer tube 12 of the condenser 13 is connected to the heat transfer tube 4 of the absorber 5. Cooling medium flows from a cooling tower through the heat transfer tube 12 of the condenser 13 and then through the heat transfer tube 4 of the absorber 5. After flowing through the heat transfer tube 4, the cooling medium returns to the cooling tower.

Operation of the system shown in FIG. 1 will be described hereinafter. Actuation of the heat source 6 heats solution in the first generator 7 and produces gas refrigerant, thereby concentrating the remained solution. The gas refrigerant produced in the first generator 7 is introduced into the heating tube 8 of the second generator 9 to heat solution therein and produce gas refrigerant. The gas refrigerant produced in the second generator 9 is introduced into the heating tube 10 of the third generator 11 to heat solution therein and produce gas refrigerant. Refrigerant in the heating tubes 8 and 10 (which changes into a liquid state as the solution is heated) and gas refrigerant produced in the third generator 11 flow into the condenser 13 where both gas refrigerant and liquid refrigerant are cooled by cooling medium flowing through the heat transfer tube 12 to change all the refrigerant to liquid state. The liquid refrigerant thus produced all flows to the evaporator 2 where it vaporizes and robs the medium to be cooled flowing through the heat transfer tube 2 of heat corresponding to the latent heat of the refrigerant while the medium is cooled thereby to produce a cooled medium of low temperature.

Meanwhile, the solution condensed in each of the generators 7, 9 and 11 by producing gas refrigerant is returned through the solution return lines 24, 25 and 26 respectively to the absorber 5. At this time, the solution is delivered under pressure through the solution spray pump 20 and sprayed upon the heat transfer tube 4 of the absorber 5. The gas refrigerant produced by vaporization of refrigerant in the evaporator 2 flows into the absorber 5 where it is absorbed in the sprayed solution, with a result that a dilute solution containing relatively much refrigerant is produced. The dilute solution produced in the absorber 5 is supplied to the first, second and third generators 7, 9 and 11 through the solution supply lines 21, 22 and 23 respectively in parallel with each other. Thus, dilute solution of substantially the same concentration is supplied to the first, second and third generators 7, 9 and 11.

Production of gas refrigerant is influenced by the temperature and the amount of heat supplied from the heating source, the level of concentration of the solution and the pressure levels in the generators. It has a characteristic such that, other conditions being equal, gas production becomes more vigorous if the level of concentration of the solution is reduced. Thus, by rendering the level of concentration of solution in the third generator 11 substantially equal to that of solution in the first generator 7, it is possible to lower the temperature of gas refrigerant in the second generator 9 which serves as the heat source of the third generator 11. If the temperature level of gas refrigerant and the level of concentration of solution in the second generator 9 are lowered, it is possible to lower the temperature level of gas refrigerant in the first generator 7 which serves as the heating source of the second generator 9. Stated differently, by rendering the levels of concentration of solution in the second and third generators 9 and 11 substantially equal to that of solution in the first generator 7, it is possible to lower the temperature level of solution in the first generator 7, thereby making it possible to inhibit corrosion of walls of the generator 7.

The effects achieved by the feature that cooling medium is caused to first flow through the heat transfer tube 12 of the condenser 13 and then flow through the heat transfer tube 4 of the absorber 5 will be described.

In the refrigeration cycle described hereinabove, a heat release section is composed of the condenser 13 and absorber 5. The heat given off by the refrigerant in the absorber 5 consists of latent heat released in the process of absorption from the gas refrigerant coming from the evaporator 3 and heat of dilution generated in the process of mixing of the refrigerant with the solution. If the amount of heat given off by the refrigerant in the absorber 5 is denoted by $Q_A$ and the refrigeration capacity of the refrigeration cycle by $Q_E$, then the following relation holds:

$$Q_A \approx 1.3 Q_E \quad (1)$$

This relation applies to all the single-stage, double-stage and triple-stage absorption refrigeration systems.

Meanwhile, the heat given off by the refrigerant in the condenser 13, which has an amount $Q_C$, is almost all accounted for by latent heat released when the gas refrigerant changes to a liquid state. The amount $Q_C$ of heat given off by the refrigerant essentially has the following relation in the single utility absorption refrigeration system:

$$Q_C \approx Q_E \quad (2)$$

In the double-stage absorption refrigeration system, the amount $Q_C$ of heat given off by the refrigerant is smaller than the corresponding amount of heat in the single-stage absorption refrigeration system by an amount corresponding to the amount of latent heat of condensation generated in the process of condensation in the third generator of gas refrigerant produced in the second generator, so that the following relation holds:

$$Q_C \approx 0.5 Q_E \quad (3)$$

In the triple-stage absorption generation system 1, the amount $Q_C$ of heat given off by the refrigerant is further smaller than the corresponding amount of heat in the double-stage absorption refrigeration system by an amount corresponding to the amount of latent heat of condensation of the gas refrigerant which is produced in the first generator 7 and utilized for heating the second generator 9, so that the amount $Q_C$ is very small and the following relation holds.

$$Q_C \approx 0.3 Q_E \quad (4)$$

Table 1 shown hereinbelow represents the amounts of $Q_A$ and $Q_C$ in relation to the refrigerating capacity $Q_E$, together with the coefficient of performance COP of an absorption refrigeration system which is given by the following equation:

$$\begin{aligned} COP &= \text{Refrigerating Capacity/Heat Input} \\ &= Q_E/(Q_A + Q_C - Q_E) \end{aligned} \quad (5)$$

TABLE 1

|  | $Q_E$ | $Q_A$ | $Q_C$ | COP |
|---|---|---|---|---|
| Single-stage System | 1 | 1.3 | 1.0 | 0.77 |
| Double-stage System | 1 | 1.3 | 0.5 | 1.25 |
| Triple-stage System | 1 | 1.3 | 0.3 | 1.67 |

In Table 1, it will be seen that, as the grade of the absorption refrigeration system is raised from single-stage to multi-stage, the amount of heat given off by the refrigerant in the condenser is reduced and the heat input necessary for heating in the generator is reduced as far as the grade reaches the triple-stage configuration (it is theoretically clear that such effects can be expected in further multi-stage configuration).

Meanwhile, it is known that as ratios to the total heat given off by a refrigerant flowing in series through the condenser and absorber, proportions of heat given off in the condenser are 40%, 30% and below 20% for the single-stage, double-stage and triple-stage absorption refrigeration system, respectively. These values appear to correspond to the figures shown in Table 1.

In this connection, in a triple-stage absorption refrigeration system, the ratio of temperature rise of the cooling medium in the condenser to that in the absorber is approximately 2 to 8. Thus, it will be seen that the condensation temperature in the condenser can be raised or lowered by an amount corresponding to 80% of the total temperature rise of the cooling medium depending on whether the cooling medium is first passed through the condenser or absorber for cooling purposes, and that the absorption temperature in the absorber can be made to be affected only by about 20%.

It will also be seen that the condenser is much more sharply affected than the absorber by the flow sequence of cooling medium, i.e. condenser-absorber or absorber-condenser. Thus, in the triple-stage absorption refrigeration system, the condenser should take priority over the absorber in deciding the flow sequence of cooling medium.

Let us now discuss, from a different point of view, the temperature of the solution in the first generator of a triple-stage absorption refrigeration system which may relate to the heat source temperature. It would be natural that if the temperature of the solution were low, it would be possible to lower the temperature of the heat source of the first generator, improve COP and effectively inhibit corrosion developing in the first generator.

The problem of how to achieve a reduction in the temperature of the first generator 7 will now be tackled.

The following parameters have been chosen for purposes of analysis:

$T_{HG}$: temperature of solution (generation temperature) in first generator 7.

$T_{LG}$: Saturation temperature (generation temperature) of concentrated solution in third generator 11.

$T_{MG}$: temperature of solution (generation temperature) in second generator 9.

$\Delta T_{MG}$: difference between condensation temperature of gas refrigerant produced in first generator 7 and $T_{MG}$, or heat exchange temperature difference of second generator 9.

$\Delta T_3$: rise in boiling point of dilute solution in first generator 7.

$\Delta \epsilon_3$: rise in boiling point following concentration of solution in first generator 7.

$\Delta T_{LG}$: heat exchange temperature difference of third generator 11.

$\Delta T_2$: rise in boiling point of solution in second generator 9.

$\Delta \epsilon_2$: rise in boiling point following concentration of solution in second generator 9.

$\Delta T_1$: rise in boiling point of solution in third generator 11.

$\Delta \epsilon_1$: rise in boiling point following concentration of solution in third generator 11.

$T_C$: condensation temperature in condenser 13.

$T_A$: saturation temperature (absorption temperature) of dilute solution in absorber 5.

$T_E$: evaporation temperature of refrigerant in evaporator 3.

$t_{Ai}$: inlet temperature of cooling medium entering absorber 5.

$t_{EO}$: outlet temperature of medium cooled in evaporator 3.

$t_{CO}$: outlet temperature of cooling medium leaving condenser 13.

$t_i$: inlet temperature of cooling medium entering triple-stage absorption refrigeration system.

$t_O$: outlet temperature of cooled medium.

$\Delta_1$: difference between inlet and outlet temperatures of cooled medium $\Delta_2$: difference between inlet and outlet temperatures of cooling medium.

$Q_C$: thermal load (amount of released heat) of condenser 13.

$Q_A$: thermal load (amount of released heat) of absorber 5.

$Q_E$: refrigerating capacity.

Figure 2:
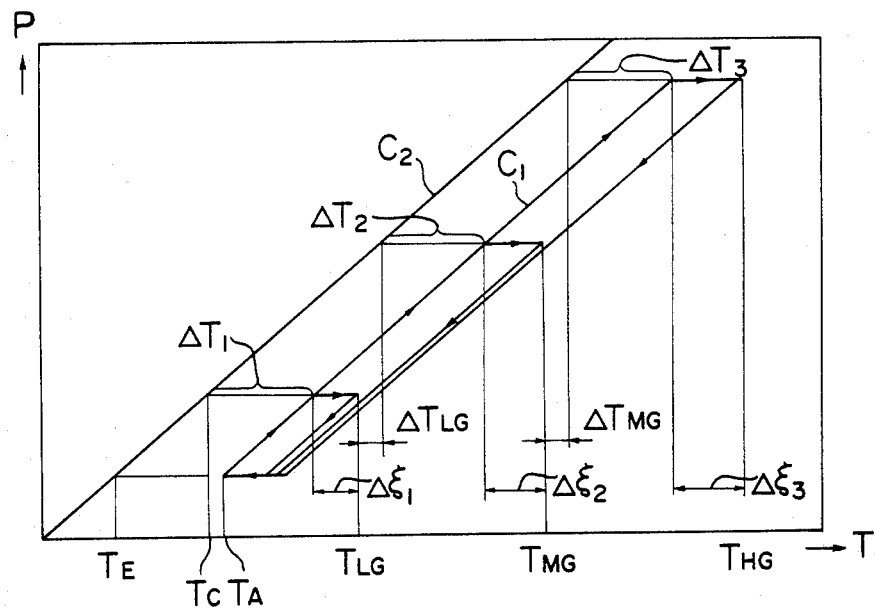
FIG. 2 is a Duhring diagram of the refrigeration cycle shown in FIG. 1.

Referring to the Duhring diagram shown in FIG. 2, the generation temperature $T_{HG}$ of the first generator 7 of a triple-stage absorption refrigeration system can be expressed by the following equation:

$$T_{HG} = T_{MG} + \Delta T_{MG} + \Delta T_3 + \Delta \epsilon_3 \quad (6)$$

Likewise, the generation temperatures $T_{MG}$ and $T_{LG}$ of the second and third, generators 9 and 11 can be expressed by the following equations respectively:

$$T_{MG} = T_{LG} + \Delta T_{LG} + \Delta T_2 \Delta \epsilon_2 \quad (7)$$

$$T_{LG} = T_C + \Delta T_1 + \Delta \epsilon_1 \quad (8)$$

By eliminating $T_{LG}$ and $T_{MG}$ from equations (6), (7) and (8), the following equation is obtained:

$$T_{HG} + T_C + \Delta T_{LG} + \Delta T_{MG} + \Delta T_1 + \Delta T_2 + \Delta T_3 + \Delta \epsilon_1 + \Delta \epsilon_2 + \Delta \epsilon_3 \quad (9)$$

In the Duhring diagram shown in FIG. 2, an isoconcentration line $C_1$ is not essentially parallel to a saturation line $C_2$ of refrigerant (water) in the strict sense. However, they can be regarded as being approximately parallel to each other because of their very little deviation from parallel.

Thus, in the following deduction, such approximation may cause some error only in the value of $T_{HG}$ itself but sufficiently accurate for the purpose of comparing the values of $T_{HG}$ with each other under the same conditions.

Thus, the following approximate relation could be obtained from lines $C_1$ and $C_2$ of the diagram shown in FIG. 2:

$$\Delta T_1 = \Delta T_2 = \Delta T_3 = T_A - T_E \quad (10)$$

Let the following definition be given:

$$\left. \begin{array}{l} \Delta T_A \equiv T_A - t_{Ai} \\ \Delta T_E \equiv t_{EO} - T_E \\ \Delta T_C \equiv T_C - t_{CO} \end{array} \right\} \quad (11)$$

Then, from equations (9), (10) and (11), the generation temperature $T_{HG}$ of the first generator 7 is:

$$T_{HG} = t_{CO} + 3(t_{Ai} - t_{EO}) + \Delta T \quad (12)$$

where $$\Delta T = \Delta T_C + 3(\Delta T_A + \Delta T_E) + \Delta T_{LG} + \Delta T_{MG} + \Delta \epsilon_1 + \Delta \epsilon_2 + \Delta \epsilon_3 \quad (13)$$

Also, let the following definition be given:

$$\epsilon = T_{HG} - (4t_i - 3t_o + \Delta T) \quad (14)$$

Here, let us calculate the heat balance of each element of the triple-stage absorption refrigeration system 1. The result is shown as follows:

$$\left. \begin{array}{l} Q_C \propto 0.2\Delta_2 \\ Q_A \propto 0.8\Delta_2 \end{array} \right\} \quad (15)$$

There are three configurations for cooling water flow sequence: in one configuration, the cooling medium would flow first through the absorber 5 and then through the condenser 13; in another one, first through the condenser 13 and then through the absorber 5; and in the last one, in parallel through the absorber 5 and condenser 13. Table 2 shows $\epsilon$ for each configuration.

TABLE 2

| Configuration | Flow of Cooling Medium | $\epsilon$ |
|---|---|---|
| 1 | From absorber 5 to condenser 13 | $\Delta_2$ |
| 2 | From condenser 13 to absorber 5 | $0.8\Delta_2$ |
| 3 | To absorber 5 and condenser 13 in parallel with each other | $\Delta_2$ |

From equation (14) and the results shown in Table 2, it will be seen that the value of $\epsilon$ is minimized in configuration 2 in which the cooling medium is made to flow from the condenser 13 to the absorber 5, and consequently it is possible to reduce the value of $T_{HG}$ or the generation temperature of the first generator 7.

In this connection, it can be said that the temperature of the heating source of the first generator 7 can be lowered, thereby giving latitude in utilizing various different heat sources.

Thus, the analysis described hereinabove has proven that in the triple-stage absorption refrigeration system shown the amount of heat released in the condenser 13 is minimized and that the coefficient of performance of the system can be improved if the cooling medium is made to flow from the condenser 13 to the absorber 5.

As the generating temperature of the first generator 7 is reduced, corrosion of the walls of the first generator 7 can be inhibited.

Figure 3:
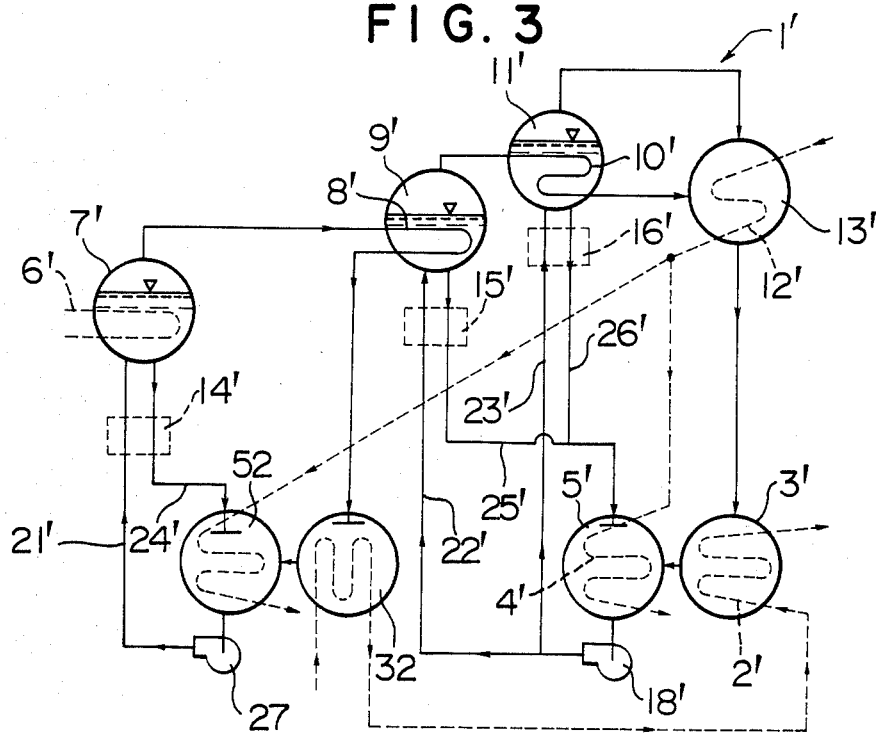
FIG. 3 is a schematic view of another embodiment of the invention.
Figure 4:
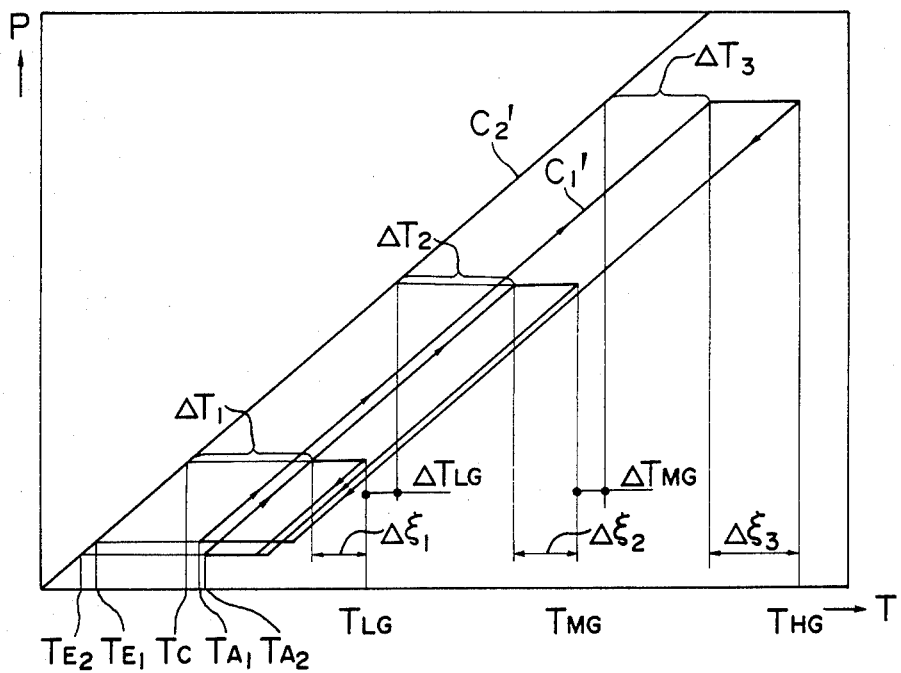
FIG. 4 is a Duhring diagram of the refrigeration cycle shown in FIG. 3.

FIGS. 3 and 4 show a second embodiment which is distinct from the first embodiment in that the former is provided with a single-stage evaporator 32 and a single-stage absorber 52. A heat transfer tube 8' of second generator 9' functions as a condenser for condensing gas refrigerant coming from first generator 7' to produce liquid refrigerant which flows into the evaporator 32 where it is evaporated to perform refrigeration. In the absorber 52, the gas refrigerant coming from the evaporator 32 is absorbed in the solution coming from first generator 7', to produce a dilute solution which is supplied to the first generator 7' by a solution pump 27. After passing through condenser 13', cooling medium flows through double-stage absorber 5' and the single-stage absorber 52 in parallel with each other while a medium to be cooled flows first to evaporator 32 and then to evaporator 3'.

Theoretical analysis of the refrigeration cycle will be conducted in the second embodiment by referring to the Duhring diagram shown in FIG. 4 in the same manner as in the first embodiment.

The following parameters are used in addition to the parameters used in the first embodiment:

$T_{LG}$: saturation temperature (generation temperature) of concentrated solution in third generator 11'.

$t_{Ai1}$: inlet temperature of cooling medium entering signal-stage absorber 52.

$t_{Ai2}$: inlet temperature of cooling medium entering double-stage absorber 5'.

$t_{EO1}$: outlet temperature of cooling medium leaving single-stage evaporator 32.

$t_{EO2}$: outlet temperature of medium cooled in double-stage evaporator 3'.

$Q_{E1}$: thermal load of single-stage evaporator 32.
$Q_{E2}$: thermal load of double-stage evaporator 3'.
$Q_{A1}$: thermal load of single-stage absorber 52.
$Q_{A2}$: thermal load of double-stage absorber 5'.

Equations (6), (7), (8) and (9) derived for the first embodiment also hold in the second embodiment, and isoconcentration line $C_1'$ and saturation line $C_2'$ of refrigerant (water) in the Duhring diagram shown in FIG. 4 can be regarded as being approximately parallel to each other. Thus, the following relations can be derived from the lines $C_1'$ and $C_2'$ of FIG. 4:

$$\Delta T_1 = \Delta T_2 = T_{A2} - T_{E2} \quad (16')$$

$$\Delta T_3 = T_{A1} - T_{E1} \quad (17'')$$

Let the following definition be given:

$$\left. \begin{array}{l} \Delta T_{A1} \equiv T_{A1} - t_{Ai1} \\ \Delta T_{A2} \equiv T_{A2} - t_{Ai2} \\ \Delta T_{E1} \equiv t_{EO1} - T_{E1} \\ \Delta T_{E2} \equiv t_{EO2} - T_{E2} \end{array} \right\} \quad (18)$$

And let the following definition be given as a typical amount of the heat exchange temperature difference of cooling medium in the condenser $13'$:

$$\Delta T_C \equiv T_C - t_{CO} \quad (19)$$

Then, the generation temperature $T_{HG}$ of the first generator $7'$ is derived as follows from equations (9), (16'), (17''), (18) and (19):

$$T_{HG} = t_{CO} + 2(t_{Ai2} - t_{EO2}) + (t_{Ai1} - t_{EO1}) + \Delta T \quad (20)$$

where $$\Delta T = \Delta T_C + 2(\Delta T_{A2} + \Delta T_{E2}) + \Delta T_{A1} + \Delta T_{E1} + \Delta T_{LG} + \Delta T_{MG} + \Delta \epsilon_1 + \Delta \epsilon_2 + \Delta \epsilon_3 \quad (21)$$

If there are one system of cooled medium and one system of cooling medium, then the following temperatures can be defined:

$\Delta_1$: difference between inlet temperature and outlet temperature of cooled medium.

$\Delta_2$: difference between inlet temperature and outlet temperature of cooling medium.

$t_i$: inlet temperature of cooling medium.

$t_O$: outlet temperature of cooling medium.

When the thermal loads of condenser $13'$, absorbers $5'$ and $52$ and evaporators $3'$ and $32$ are determined, the $t_{CO}$, $t_{Ai1}$, $t_{EO1}$, $t_{Ai2}$ and $t_{EO2}$ in equation (20) can be related to $\Delta_1$, $t_O$, $\Delta_2$ and $t_i$. By applying such relations to equation (14), the values of $\epsilon$ maybe expressed only with $\Delta_1$ and $\Delta_2$.

Meanwhile, $\Delta_1$ and $\Delta_2$ are determined according to the conditions of external equipment and to thermal load requirements separately from the main body of the refrigeration system. Stated differently, if certain common values for $\Delta_1$ and $\Delta_2$ are given, various types of systems can be compared with respect to $T_{HG}$ by using $\epsilon$.

Rough calculation shows heat balance and thermal load of each element as follows:

$$\left. \begin{array}{l} Q_{E1} \propto \frac{1}{3}\Delta_1 \\ Q_{E2} \propto \frac{2}{3}\Delta_1 \\ Q_C \propto 0.2\Delta_2 \\ Q_{A1} \propto 0.3\Delta_2 \\ Q_{A2} \propto 0.5\Delta_2 \end{array} \right\} \quad (22)$$

Flow configuration of the cooled medium will now be discussed. In the following three configurations, each $\epsilon$ can be derived from equations (20), (14) and (22) as follows:

(i) In the configuration shown in FIG. 3 in which the cooled medium is made to flow in series from the single-stage evaporator $32$ to the first evaporator $3'$:

$$\epsilon_1 = (t_{CO} + 2t_{Ai1} + t_{Ai2} - 4t_O) - \frac{5}{3}\Delta_1 \equiv \epsilon_0 - \frac{5}{3}\Delta_1 \quad (23)$$

(ii) In the configuration in which the cooled medium flows in series in the reverse direction:

$$\epsilon_2 = \epsilon_0 - \frac{2}{3}\Delta_1 \quad (24)$$

(iii) In the configuration in which the cooled medium is made to flow in parallel through evaporators $32$ and $3'$:

$$\epsilon_3 = \epsilon_0 \quad (25)$$

From equations (23), (24) and (25):

$$\epsilon_1 = \epsilon_2 < \epsilon_3 \quad (26)$$

Thus, it is theoretically concluded that in a modified triple-stage absorption refrigeration system $1'$, it is possible to reduce the generation temperature of first generator $7'$ by causing the medium to be cooled to flow in series through evaporator $32$ and $3'$.

Let us now discuss cooling medium flow configuration. As shown in Table 3, there are ten configurations for flowing a cooling medium among the condenser $13'$, absorber $5'$ and single utility-stage absorber $52$. For each configuration, $\epsilon$ value is derived from equations (22) and (23), and each configuration is marked with figure of merit which corresponds to $\epsilon$ value, where a smaller figure suggests lower generation temperature of the first generator $7'$.

In Table 3, absorber $52$, absorber $5'$ and condenser $13'$ are denoted by $A_1$, $A_2$ and $C$ respectively.

TABLE 3

| System No. | Cooling Medium Flow Systems | $\epsilon$ | Evaluation |
|---|---|---|---|
| 1 | $A_1 \rightarrow A_2 \rightarrow C$ | $1.6 \Delta_2 - \frac{2}{3}\Delta_1$ | 6 |
| 2 | $A_1 \rightarrow C \rightarrow A_2$ | $1.5 \Delta_2 - \frac{2}{3}\Delta_1$ | 5 |
| 3 | $A_2 \rightarrow A_1 \rightarrow C$ | $1.5 \Delta_2 - \frac{2}{3}\Delta_1$ | 5 |
| 4 | $A_2 \rightarrow C \rightarrow A_1$ | $1.4 \Delta_2 - \frac{2}{3}\Delta_1$ | 4 |
| 5 | $C \rightarrow A_1 \rightarrow A_2$ | $1.4 \Delta_2 - \frac{2}{3}\Delta_1$ | 4 |
| 6 | $C \rightarrow A_2 \rightarrow A_1$ | $1.3 \Delta_2 - \frac{2}{3}\Delta_1$ | 3 |
| 7 | $A_1 \rightarrow A_2$, C in parallel | $1.6 \Delta_2 - \frac{2}{3}\Delta_1$ | 6 |
| 8 | $A_2 \rightarrow A_1$, C in parallel | $1.5 \Delta_2 - \frac{2}{3}\Delta_1$ | 5 |
| 9 | $C \rightarrow A_1$, $A_2$ in parallel | $0.8 \Delta_2 - \frac{2}{3}\Delta_1$ | 1 |
| 10 | $A_1$, $A_2$, C in parallel | $\Delta_2 - \frac{2}{3}\Delta_1$ | 2 |

As seen in Table 3, No. 9 configuration, in which the cooling medium is made to usually flow from the condenser $13'$ to the absorbers $5'$ and $52$ in parallel as shown in FIG. 3, is most effective for reducing the generation temperature of the first generator $7'$, and No. 10 configuration, in which the cooling medium is made to flow to the condenser $13'$ and absorbers $5'$ and $52$ in parallel is next.

Let us now discuss the absorbed heat transfer area ratio of the two absorbers $5'$ and $52$ of the second embodiment shown in FIG. 3. If the heat transfer area of the absorber $52$ is expressed in ratio to the total one and denoted by x, then that of the absorber $5'$ is denoted by $(1-x)$, and the following relation holds:

$$\frac{T_{A1}}{T_{A2}} = 1.1 \tag{28}$$

$(2\Delta T_{A2}+T_{A1})$ is minimized when $x \approx 0.35$, and the following relation holds:

$$T_{A1}/T_{A2}=1.1 \tag{28}$$

Thus, it will be understood that at the heat transfer ratio 0.35 of the absorber 52, the generation temperature of the first generator 7' is lowest.

In the vicinity of $x=0.35$, there is no great fluctuation in value of $(2\Delta T_{A2}+T_{A1})$. Therefore, the value of $T_{GH}$ is almost lowest so long as $\Delta T_{A1} \approx \Delta T_{A2}$.

Let us discuss the heat transfer area ratio of evaporator 32 and evaporator 3'. By denoting the heat transfer area ratio of the former by y and that of the latter by $(1-y)$, the following relation is expressed:

$$(2\Delta T_{E2} + \Delta T_{E1}) \propto \left( 2 \times \frac{2}{1-y} + \frac{1}{y} \right) \tag{29}$$

Thus, the value of $(2\Delta T_{E2}+\Delta T_{E1})$ is minimized when $y=\frac{1}{3}$ similarly to the case of equation (27), and the ratio of $\Delta T_{E1}$ to $\Delta T_{E2}$ is derived as follows by equation (27):

$$\Delta T_{E2}=\Delta T_{E1} \tag{30}$$

Therefore, the generation temperature $T_{HG}$ of the first generator 7' can be made lowest by selecting the heat transfer area ratio $\frac{1}{3}$ for the evaporator 32 ($\Delta T_{E1}=\Delta T_{E2}$).

What is claimed is:

1. A multi-stage absorption refrigeration system comprising;
    a first generator equipped with a heating source for heating a solution to vaporize a refrigerant therein and produce a gas refrigerant;
    means conveying said gas refrigerant produced in said first generator to a second generator utilizing the gas refrigerant produced in said first generator as a heating source for heating the solution to vaporize refrigerant therein and produce gas refrigerant;
    means conveying said gas refrigerant produced in said second generator to a third generator utilizing the gas refrigerant produced in said second generator as a heating source for heating the solution to vaporize refrigerant therein and produce gas refrigerant;
    condenser means for cooling the gas refrigerant produced in the first generator and second generator and used for heating the solution in the next following generator and the gas refrigerant produced in the third generator, to produce liquid refrigerant;
    evaporator means vaporizing the liquid refrigerant produced in the condenser means to thereby cool a medium to be cooled while producing gas refrigerant;
    absorber means causing the gas refrigerant produced in said evaporator means to be absorbed in a concentrated solution produced in each said generator to produce a dilute solution;
    a solution supply system for supplying the dilute solution produced in said absorber means directly to each said generator without passing through another generator;
    pump means for supplying the dilute solution to each said generator through said solution supply system;
    heat exchanger means comprising a plurality of heat exchangers each for causing heat exchange to take place between the solutions going into and coming from each generator; and
    a cooling medium flow system causing the cooling medium to flow first through the condenser means and then through the absorber means.

2. A multi-stage absorption refrigeration system comprising;
    a first generator equipped with a heating source for heating a solution to vaporize a refrigerant therein and produce gas refrigerant;
    a second generator utilizing the gas refrigerant produced in said first generator as a heating source for heating the solution to vaporize refrigerant therein and produce gas refrigerant;
    a third generator utilizing the gas refrigerant produced in said second generator as a heating source for heating the solution to vaporize refrigerant therein and produce gas refrigerant;
    condenser means for cooling the gas refrigerant produced in the first generator and second generator and used for heating the solution in the next following generator and the gas refrigerant produced in the third generator, to produce liquid refrigerant;
    evaporator means vaporizing the liquid refrigerant produced in the condenser means to thereby cool a medium to be cooled while producing gas refrigerant;
    absorber means causing the gas refrigerant produced in said evaporator means to be absorbed in a concentrated solution produced in each said gnerator to produce a dilute solution;
    a solution supply system for supplying the dilute solution produced in said absorber means directly to each said generator without passing through another generator;
    pump means for supplying the dilute solution to each said generator through said solution supply system;
    heat exchanger means comprising a plurality of heat exchangers each for causing heat exchanged to take place between the solutions going into and coming from each generator;
    a cooling medium flow system causing the cooling medium to flow first through the condenser means and then through the absorber means, and
    wherein said absorber means comprises a single-stage absorber receiving solution from said first generator and sending it again thereto, and a double-stage absorber receiving solution from said second and third generators and sending it again thereto, and said evaporator means comprises a single-stage evaporator for vaporizing liquid refrigerant condensed in said second generator by heat-exchanging with the solution in said second generator, and a double-stage evaporator for vaporizing the liquid refrigerant flowing from said condenser means.

3. A multi-stage absorption refrigeration system as claimed in claim 2, wherein the ratio of the heat transfer area of said single-stage absorber to that of said double-stage absorber is 0.35 to 0.65.

4. A multi-stage absorption refrigeration system as claimed in claim 2, wherein the ratio of the heat transfer area of said single-stage evaporator to that of said double-stage evaporator is $\frac{1}{3}$ to $\frac{2}{3}$.

5. A multi-stage absorption refrigeration system as claimed in claim 3, wherein the ratio of the heat transfer area of said single-stage evaporator to that of said double-stage evaporator is $\frac{1}{3}$ to $\frac{2}{3}$.

6. A multi-stage absorption refrigeration system as claimed in claim 1, wherein said absorber means comprises one absorber and said evaporator means comprises one evaporator, and said solution supply system conducts solution from said one absorber to each said first, second and third generator directly in parallel with each other without passing through other generator.

7. A multi-stage absorption refrigeration system as claimed in claim 6, wherein said heat exchanger means further comprises a fourth heat exchanger allowing heat exchange to take place between solution just flowing into said absorber and solution just flowing out of the absorber.

8. A multi-stage absorption refrigeration system as claimed in claim 6, wherein said pump means further comprises a second solution pump located in a solution supply line to said first generator.

9. A multi-stage absorption refrigeration system as claimed in claim 2, wherein said cooling medium flow system is adapted to cause cooling medium to flow firstly through said condenser means, and then through said single-stage absorber and said double-stage absorber in parallel.

10. A multi-stage absorption refrigeration system as claimed in claim 2, wherein said evaporator means has a flow system for a medium to be cooled, said flow system causing the medium to be cooled to flow firstly through the single-stage evaporator and then through the double-stage evaporator.

* * * * *